(12) United States Patent
Tanaka et al.

(10) Patent No.: US 8,253,359 B2
(45) Date of Patent: Aug. 28, 2012

(54) ELECTRIC ROTATING MACHINE CONTROL SYSTEM AND VEHICLE DRIVING SYSTEM INCLUDING THE ELECTRIC ROTATING MACHINE CONTROL SYSTEM

(75) Inventors: Kazuhiro Tanaka, Chiryu (JP); Daisuke Ogino, Anjo (JP); Subrata Saha, Anjo (JP); Jin Izawa, Obu (JP)

(73) Assignee: Aisin AW Co., Ltd., Anjo (JP)

( * ) Notice: Subject to any disclaimer, the term of this patent is extended or adjusted under 35 U.S.C. 154(b) by 424 days.

(21) Appl. No.: 12/382,038

(22) Filed: Mar. 6, 2009

(65) Prior Publication Data

US 2009/0243523 A1 Oct. 1, 2009

(30) Foreign Application Priority Data

Mar. 25, 2008 (JP) ................................. 2008-078269

(51) Int. Cl.
*H02P 3/14* (2006.01)
(52) U.S. Cl. ................... 318/376; 318/400.04; 318/800; 318/801; 318/806; 318/798; 363/15; 363/109; 290/16; 290/14; 320/104; 320/134; 307/10.1; 307/9.1; 180/65.285; 180/65.29; 180/65.31
(58) Field of Classification Search .................. 318/376, 318/400.04, 432, 434; 180/65.285, 65.51, 180/65.31; 363/109, 15, 37, 40; 290/14, 290/16; 320/104, 134; 307/10.1, 9.1
See application file for complete search history.

(56) References Cited

U.S. PATENT DOCUMENTS

| | | | |
|---|---|---|---|
| 4,475,150 A * | 10/1984 | D'Atre et al. ................... 363/51 |
| 6,229,278 B1 | 5/2001 | Garces et al. | |
| 6,232,729 B1 * | 5/2001 | Inoue ............................ 318/139 |
| 6,724,165 B2 * | 4/2004 | Hughes .......................... 318/376 |
| 7,099,756 B2 * | 8/2006 | Sato ................................. 701/22 |
| 7,196,492 B2 * | 3/2007 | Sugiura et al. ................. 320/101 |
| 7,212,891 B2 | 5/2007 | Sato | |
| 7,317,292 B2 * | 1/2008 | Iura et al. ....................... 318/434 |

(Continued)

FOREIGN PATENT DOCUMENTS

JP 11-332006 * 11/1999

(Continued)

OTHER PUBLICATIONS

Translation of Office Action issued in German Application No. 11 2009 000 040.1 dated Jun. 1, 2012.

*Primary Examiner* — Rita Leykin
(74) *Attorney, Agent, or Firm* — Oliff & Berridge, PLC (57) ABSTRACT

A control system includes an electric rotating machine; a driving circuit that is connected to a DC power supply, the driving circuit includes a frequency conversion unit configured such that, when the electric rotating machine is to be driven in a power running mode, the frequency conversion unit converts an output of the DC power supply into AC electric power, and when the electric rotating machine is to be driven in a regenerative operation mode, the frequency conversion unit converts an output of the electric rotating machine into DC electric power; and a control unit that controls the driving circuit, wherein the control unit judges whether a connection between the DC power supply and the driving circuit is being maintained, and is configured such that, when the connection is not being maintained, regenerative electric power generated by the electric rotating machine is reduced by controlling the driving circuit.

6 Claims, 7 Drawing Sheets

U.S. PATENT DOCUMENTS

| | | | |
|---|---|---|---|
| 7,355,869 B2 * | 4/2008 | Okamura | 363/132 |
| 7,471,003 B2 * | 12/2008 | Kobayashi et al. | 290/40 C |
| 7,663,343 B2 * | 2/2010 | Soma et al. | 320/134 |
| 7,759,885 B2 * | 7/2010 | Yamada et al. | 318/400.15 |
| 7,834,578 B2 * | 11/2010 | Sato | 318/800 |
| 7,893,637 B2 * | 2/2011 | Suhama et al. | 318/376 |
| 7,896,116 B2 * | 3/2011 | Tatematsu et al. | 180/65.6 |
| 7,963,353 B2 * | 6/2011 | Tatematsu et al. | 180/65.22 |
| 2003/0081440 A1 | 5/2003 | Komatsu et al. | |
| 2007/0158121 A1 * | 7/2007 | Sato | 180/65.3 |
| 2009/0058339 A1 * | 3/2009 | Kitano | 318/400.22 |
| 2009/0167216 A1 * | 7/2009 | Soma et al. | 318/376 |
| 2009/0243522 A1 * | 10/2009 | Suhama et al. | 318/376 |

FOREIGN PATENT DOCUMENTS

| | | | |
|---|---|---|---|
| JP | 11332006 | * | 11/1999 |
| JP | A-11-332006 | | 11/1999 |
| JP | 2003-244801 | * | 8/2003 |
| JP | A-2003-244801 | | 8/2003 |
| JP | A-2004-274945 | | 9/2004 |
| JP | A-2006-246653 | | 9/2006 |
| JP | 200813119 A | * | 1/2008 |
| JP | 2008131119 A | * | 1/2008 |
| JP | A-2008-13119 | | 1/2008 |
| WO | WO 2006/095529 A1 | | 9/2006 |
| WO | WO 2008/004418 A1 | | 1/2008 |

* cited by examiner

ELECTRIC ROTATING MACHINE CONTROL SYSTEM AND VEHICLE DRIVING SYSTEM INCLUDING THE ELECTRIC ROTATING MACHINE CONTROL SYSTEM

INCORPORATION BY REFERENCE

The disclosure of Japanese Patent Application No. 2008-078269 filed on Mar. 25, 2008 including the specification, drawings and abstract is incorporated herein by reference in its entirety.

BACKGROUND

The present invention relates to an electric rotating machine control system and a vehicle driving system.

In recent years, ideas for reducing the effect of fossil fuel consumption on the environment are being widely implemented. In industries, automobiles have been proposed which provide the advantage of a reduced effect on the environment as compared with automobiles employing an internal-combustion engine as a driving source. Examples of such arrangements include: an electric vehicle employing an electric motor, which is an electric rotating machine, as the driving source; and a hybrid vehicle employing an internal-combustion engine and an electric motor as the driving sources. In such an electric vehicle or a hybrid vehicle, the electric motor is connected to a battery that supplies electric power to the electric motor. The electric motor, which is an electric rotating machine, also has a function as a generator which generates electric power using the kinetic energy of the vehicle. The electric power thus generated is returned to and stored in the battery. A switch circuit (contactor) is provided between the electric rotating machine and the battery. In the closed state of the contactor, the electric rotating machine and the battery are electrically connected to each other. When the vehicle is in an abnormal state, in order to ensure safety, the contactor is switched to the opened state, thereby releasing the electric connection between the electric rotating machine and the battery. An example is described in Japanese Patent Application Publication No. JP-A-2004-274945 (Paragraphs 2 to 12, etc.), in which, in a case in which the battery is in an abnormal state, the contactor is switched to the opened state, thereby cutting off the connection between the electric rotating machine and the battery.

SUMMARY

As described in Japanese Patent Application Publication No. JP-A-2004-274945 (Paragraphs 2 to 12, etc.), in a preferable embodiment, a relay is often employed as the contactor. In many cases, the relay employed in a high-voltage large-current circuit included in an electric vehicle or a hybrid vehicle is a relay having a mechanical contact. In a case in which the contactor goes to the opened state during the regenerative operation of the electric rotating machine due to malfunctioning of the mechanical contact, malfunctioning of the electric magnet unit (coil unit), noise contamination in the control signal to the relay, or the like, the connection to the battery is unexpectedly released. Furthermore, the connection between the electric rotating machine and the battery can be unexpectedly released due to damage to the power cable that connects the relay and the battery, damage to the power cable that connects the relay and the circuit on the electric rotating machine side (inverter circuit or the like), etc.

In this case, the regenerative electric power, which is to be returned to the battery via a circuit on the electric rotating machine side, is not returned, and is stored in a circuit on the electric rotating machine side, e.g., a smoothing capacitor or the like. This leads to a situation in which the voltage at the circuit on the electric rotating machine side rises very high, as compared with that in the regenerative operation in a normal state. In general, the circuit on the electric rotating machine side including a driving circuit such as an inverter also has an overvoltage protection function. However, in a case in which a rapid rise in the voltage has occurred, in some cases, the voltage rises highly before the overvoltage is detected so as to start the protection operation. In some cases, an auxiliary apparatus such as an air conditioner etc., is connected to the connection between the circuit on the electric rotating machine side and the DC power supply. Such a rise in the voltage can exceed the rated voltage of the auxiliary apparatus.

The present invention has been conceived in light of the aforementioned problem. Accordingly, it is an object of the present invention to provide an electric rotating machine control system configured such that, in a case in which the connection between the DC power supply which supplies electric power to an electric rotating machine and the electric rotating machine has been released, overvoltage is prevented from being applied to a circuit on the electric rotating machine side and an auxiliary apparatus connected to the circuit. The present invention can also achieve various other advantages.

According to an exemplary aspect of the invention, an electric rotating machine control system includes an electric rotating machine; a driving circuit that is connected to a DC power supply, the driving circuit includes a frequency conversion unit configured such that, when the electric rotating machine is to be driven in a power running mode, the frequency conversion unit converts an output of the DC power supply into AC electric power, and when the electric rotating machine is to be driven in a regenerative operation mode, the frequency conversion unit converts an output of the electric rotating machine into DC electric power; and a control unit that controls the driving circuit, wherein the control unit judges whether a connection between the DC power supply and the driving circuit is being maintained, and is configured such that, when the connection is not being maintained, regenerative electric power generated by the electric rotating machine is reduced by controlling the driving circuit.

BRIEF DESCRIPTION OF THE DRAWINGS

Various exemplary aspects of the invention will be described with reference to the drawings, wherein.

DETAILED DESCRIPTION OF EMBODIMENTS

First Embodiment

Figure 1:
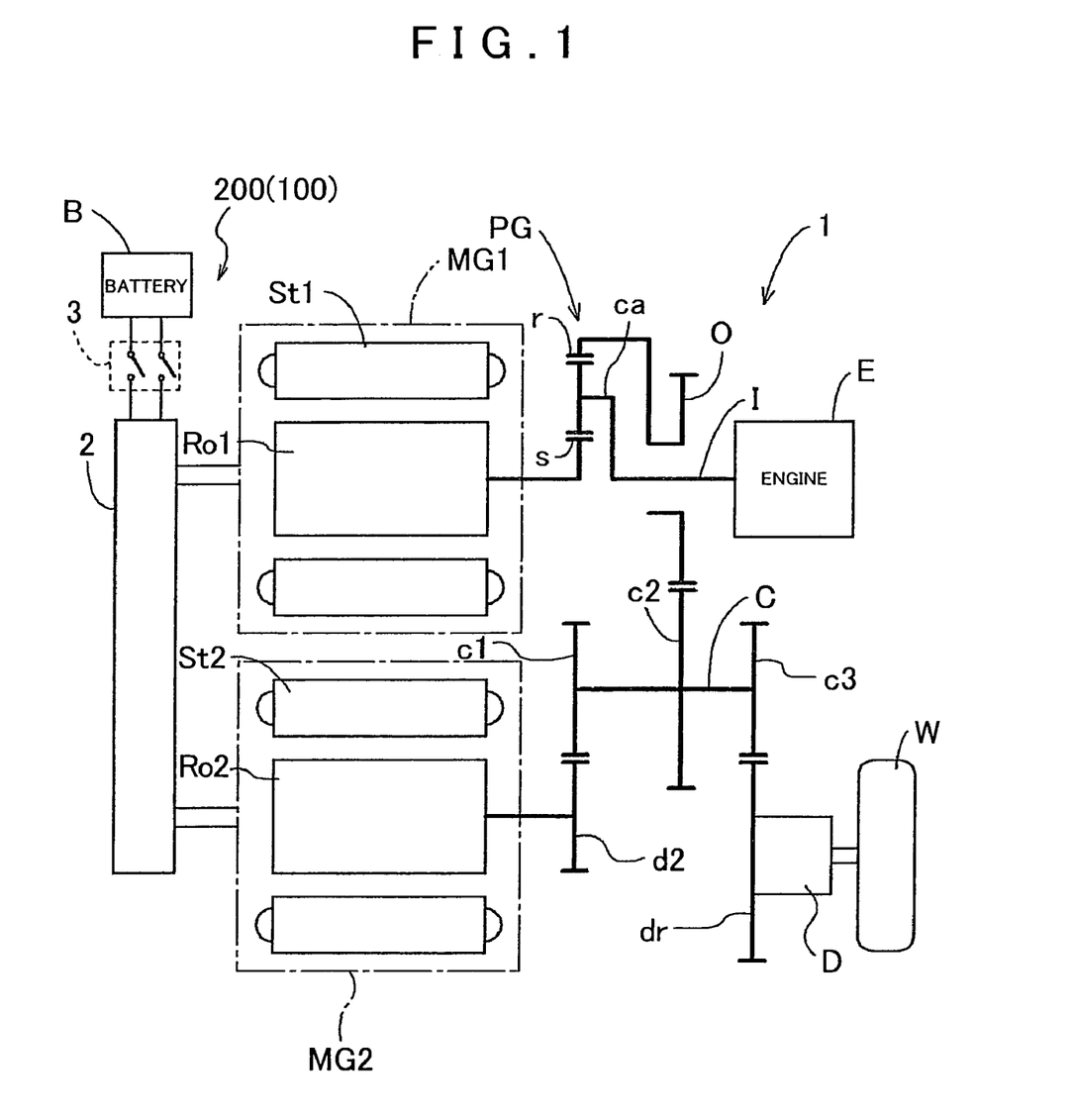
FIG. 1 is a block diagram which shows a schematic configuration of a driving system of a vehicle driving system.
Figure 2:
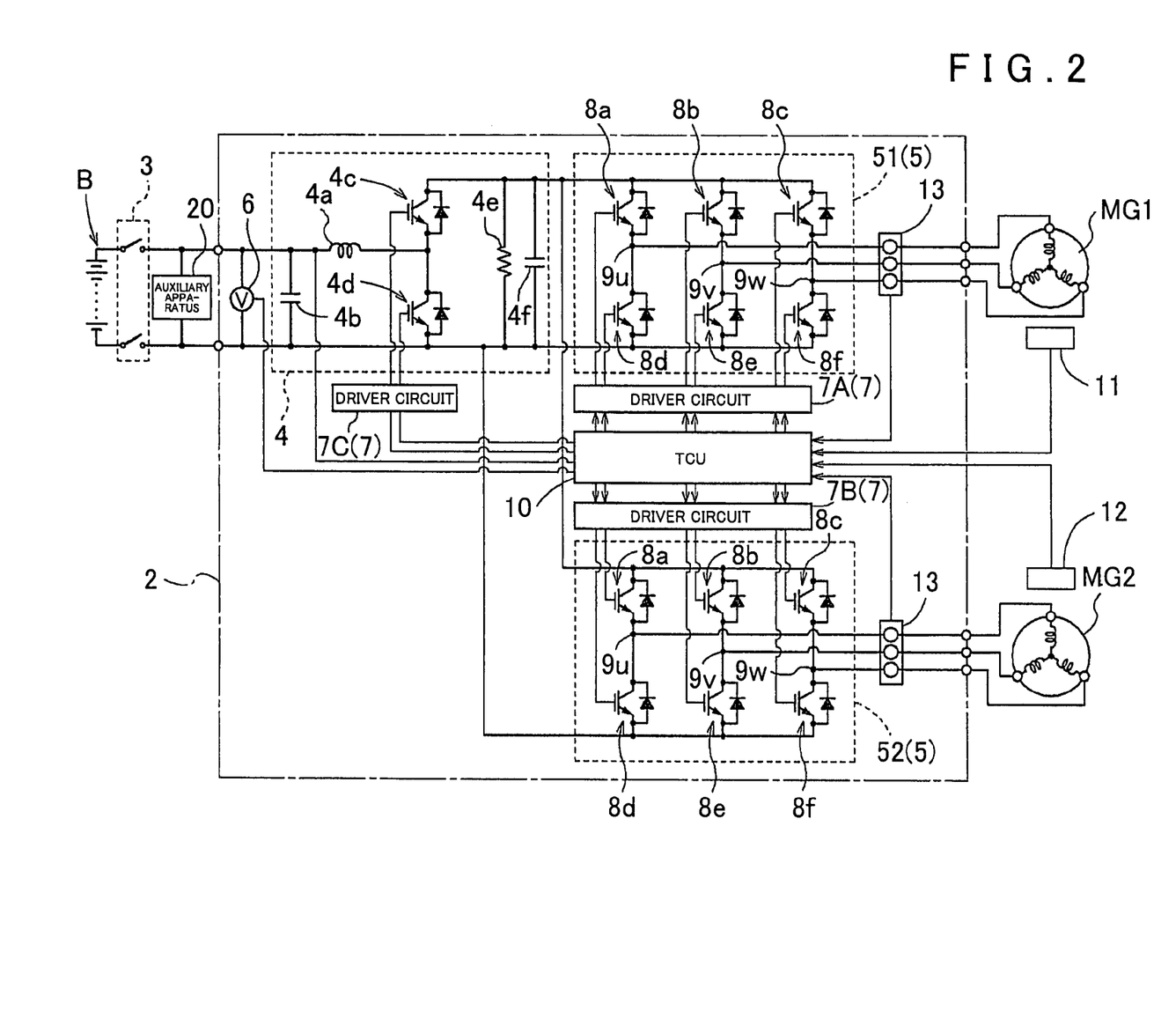
FIG. 2 is a schematic block diagram which shows an example of the configuration of the electric rotating machine control system.

Description will be made below regarding an embodiment of an electric rotating machine control system according to the present invention with reference to the drawings. FIG. 1 is a schematic block diagram which shows a configuration of a driving system of a vehicle driving system 200. FIG. 2 is a schematic block diagram which shows a configuration of an electric rotating machine control system of which the principal component is an electric rotating machine driving apparatus (driving circuit) 2 provided for controlling electric rotating machines MG1 and MG2. Description will be made below as an example regarding an arrangement in which an electric rotating control system 100 is included in the vehicle driving system, and controls the operation of the electric rotating machine included in the vehicle driving system.

As shown in FIG. 1, the vehicle includes an engine E which is an internal-combustion engine, and a pair of electric rotating machines MG1 and MG2, as its driving sources. The vehicle driving system 200 has a configuration including a so-called 2-motor split type hybrid driving apparatus 1 including a planetary gear mechanism PG for power distribution which distributes the output of the engine E to a first electric rotating machine MG1 side and wheels and a second electric rotating machine MG2 side. As the engine E, various kinds of known internal-combustion engines can be employed, examples of which include a gasoline-powered engine, diesel engine, etc. As described later, each of the electric rotating machines MG1 and MG2 functions as either an electric motor or a generator (electric generator). Accordingly, in a case in which there is no need to distinguish a particular rotating machine, the electric rotating machine will simply be referred to "electric rotating machine", and the reference numeral MG1 or MG2 may be omitted.

As mechanical components, the hybrid driving apparatus 1 includes an input shaft I connected to the engine E, the first electric rotating machine MG1, the second electric rotating machine MG2, the planetary gear mechanism PG for power distribution, a counter gear mechanism C, and a differential apparatus D which distributes the driving force to multiple wheels W. Here, the planetary gear mechanism PG distributes the output (driving force) of the engine E to the first electric rotating machine MG1 and a counter drive gear O. The counter drive gear O is connected to the wheel (driving wheel) W via the counter gear mechanism C and the differential apparatus D. The second electric rotating machine MG2 is connected such that the output torque can be transmitted through a driving force transmission system from the counter drive gear O up to the differential apparatus D.

As shown in FIG. 1, in the hybrid driving apparatus 1, the input shaft I, which is connected to the output rotating shaft such as a crank shaft or the like of the engine E, the first electric rotating machine MG1, and the planetary gear mechanism PG which functions as a driving force distribution mechanism, are coaxially arranged. Furthermore, the second electric rotating machine MG2, the counter gear mechanism C, and the differential apparatus D are arranged on an axis in parallel with the input shaft I. A first counter driven gear c1, a second counter driven gear c2, and a differential pinion gear c3 are fixed to the shaft (counter shaft) of the counter gear mechanism C in this order from the side of the first electric rotating machine MG1 and the second electric rotating machine MG2. Here, the differential pinion gear c3 meshes with a differential ring gear dr of the differential apparatus D. With such a configuration, the rotation of the counter gear mechanism C is transmitted to the wheel W via the differential apparatus D. The differential apparatus D is structured having a differential gear mechanism using a bevel gear, for example, which is commonly employed. It should be noted that, an arrangement is preferably made in which the input shaft I is connected to the output rotating shaft of the engine E through a damper, clutch, or the like.

The first electric rotating machine MG1 includes a stator St1 fixed to an unshown case, and a rotor Ro1 rotatably supported on the inside of the stator St1 in the radial direction. The rotor Ro1 of the first electric rotating machine MG1 is connected to rotate integrally with a sun gear s of the planetary gear apparatus PG which functions as a power distribution mechanism. Furthermore, the second electric rotating machine MG2 includes a stator St2 fixed to an unshown case, and a rotor Ro2 rotatably supported on the inside of the stator St2 in the radial direction. The rotor Ro2 of the second electric rotating machine MG2 is connected to rotate integrally with a second electric rotating machine output gear d2. The second electric rotating machine output gear d2 meshes with the first counter driven gear c1 fixed to the counter gear mechanism C. Accordingly, the rotation of the second electric rotating machine MG2 is transmitted to the counter gear mechanism C. Thus, the rotor Ro2 of the second electric rotating machine MG2 rotates at a rotational speed in proportion to the rotational speed of the counter drive gear O.

As shown in FIG. 1, the first electric rotating machine MG1 and the second electric rotating machine MG2 are electrically connected to a battery (DC power supply) B via the electric rotating machine driving apparatus (driving circuit) 2. Furthermore, the electric rotating machine driving apparatus 2 and the battery B are electrically connected to each other via a contactor (switch circuit) 3. When the contactor 3 is in the closed state, the electric rotating machine driving apparatus 2 and the battery B are electrically connected to each other. In an abnormal state of the vehicle, the contactor 3 goes to the opened state by the control operation of an unshown vehicle ECU or the like, which releases the electric connection between the electric rotating machine driving apparatus 2 and the battery B, thereby ensuring safety. In many cases, the contactor 3 is configured employing a relay, giving consideration to a longer lifetime and satisfactory controllability thereof. As shown in FIG. 2, on the electric rotating machine driving apparatus 2 side, connection of an auxiliary apparatus 20, which is driven using electric power supplied from the battery B, is made via the contactor 3. The auxiliary apparatus 20 is an air conditioner, DC-DC converter, or the like.

Each of the first electric rotating machine MG1 and the second electric rotating machine MG2 provides a function as an electric motor which receives the corresponding electric power and generates power, and a function as a generator (electric generator) which receives supply of power and generates electric power. In the configuration example according to the present embodiment, the first electric rotating machine MG1 principally functions as a generator which generates electric power using the driving force input via the sun gear s of the planetary gear mechanism PG. The first electric rotating machine MG1 charges the battery B, or supplies the electric power for driving the second electric rotating machine MG2. It should be noted that, when the vehicle is being driven at a high speed, when the engine E is started up, or the like, in some cases, the first electric rotating machine MG1 performs a power running operation and functions as an electric motor which outputs the driving force. On the other hand, the second electric rotating machine MG2 principally functions as an auxiliary electric motor which provides the driving force used for driving the vehicle. It should be noted that, when the vehicle speed is reduced, the second electric rotating machine MG2 functions as a generator which returns the inertial force of the vehicle as electric energy in the form of regenerative electric power. Such operations of the first electric rotating machine MG1 and the second electric rotating machine MG2 are controlled by a TCU (trans-axle control unit) 10 (see FIG. 2).

The TCU 10 functions as a control unit according to the present invention, which controls the electric rotating machines MG1 and MG2 via the electric rotating machine driving apparatus (driving circuit) 2 including a voltage conversion unit 4 and a frequency conversion unit 5 as described later. It should be noted that the control unit according to the present invention may be a superordinate ECU (electronic control unit) which controls the TCU 10. The TCU 10 and ECU are preferably provided principally including a microcomputer and so forth.

As shown in FIG. 1, the planetary gear mechanism PG has a single pinion type configuration in which it is arranged coaxially with the input shaft I. That is to say, the planetary gear mechanism PG includes a carrier ca which supports multiple pinion gears, a sun gear s which meshes with each of the pinion gears, and a ring gear r, as rotating elements. The sun gear s, which is provided as a first rotating element, is connected to rotate integrally with the rotor Ro1 of the first electric rotating machine MG1. The carrier ca, which is provided as a second rotating element, is connected to the input shaft I which is connected to rotate integrally with the output rotating shaft of the engine E. The ring gear r, which is provided as a third rotating element, is connected to rotate integrally with the counter drive gear O. The counter drive gear O meshes with the second counter driven gear c2 fixed to the counter gear mechanism C, and the rotation of the ring gear r of the planetary gear apparatus PG is transmitted to the counter gear mechanism C. Then, the rotation of the counter gear mechanism C is transmitted to the wheel W via the differential apparatus D.

With the configuration shown in FIG. 1, the first electric rotating machine MG1 is connected to the sun gear s provided as a first rotating element. Furthermore, the engine E, which is a driving source other than the electric rotating machines MG1 and MG2, is connected to the carrier ca provided as a second rotating element. Moreover, the second electric rotating machine MG2 and the ring gear r provided as a third rotating element are connected to the wheel W via the differential apparatus D. However, the configuration of the driving system is not restricted to such an arrangement. An arrangement may be made in which the second electric rotating machine MG2 is directly connected to the differential apparatus D. Also, an arrangement may be made in which the second electric rotating machine MG2 is connected to the third rotating element or a different driving transmission element, and is connected to the differential apparatus D via the rotating element or the driving transmission element.

FIG. 2 is a block diagram which shows a schematic configuration of an electric rotating machine control system principally including the electric rotating machine driving apparatus 2. The electric rotating machine control system has a configuration including the battery B, the electric rotating machines MG1 and MG2, and the electric rotating machine driving apparatus 2 introduced between the battery B and the electric rotating machines MG1 and MG2. Furthermore, the electric rotating machine driving apparatus 2 includes the voltage conversion unit (converter) 4 and the frequency conversion unit (inverter) 5 arranged in this order from the battery B side. As shown in FIG. 2, with the present embodiment, frequency conversion units 51 and 52, which correspond to the frequency conversion unit 5, are provided to a pair of the electric rotating electric machines MG1 and MG2, respectively.

Current sensors 13, each of which measures the current that flows the electric rotating machine, is provided between the frequency conversion unit 5 and each of the electric rotating machines MG1 and MG2. Description will be made in the embodiment regarding an arrangement in which the currents of all the three phases are measured. However, there is an equilibrium state among these three phases, and accordingly, the sum of the currents of these three phases is zero. Accordingly, an arrangement may be made in which the currents of only two phases are measured, and the TCU 10 computes the remaining one phase.

The battery B is capable of supplying electric power to the electric rotating machines MG1 and MG2. Furthermore, the battery B is capable of storing electric power received from the electric rotating machines MG1 and MG2. A voltage measurement unit 6 is provided at a connection that connects the battery B (contactor 3) and the electric rotating machine driving apparatus 2, which measures, at the connection, the power supply voltage (input/output voltage) of the electric rotating machine driving apparatus 2. That is to say, the battery voltage (input/output voltage) including the voltage supplied from the battery B to the electric rotating machine driving apparatus 2 and the auxiliary apparatus 20, and the voltage returned from the electric rotating machine driving apparatus 2 to the battery B as a regenerative voltage, is measured. The battery voltage thus measured is used to perform the control operation of the TCU 10 as described later. The voltage measurement unit 6 is configured using a voltage sensor, for example.

The voltage conversion unit (converter) 4 has a configuration including a reactor 4a, a filter capacitor 4b, a pair of upper and lower switching elements 4c and 4d, a discharging resistor 4e, and a smoothing capacitor 4f. As the switching elements 4c and 4d, IGBTs (insulated gate bipolar transistors) or MOSFETs (metal oxide semiconductor field effect transistors) are preferably employed. In the present embodiment, description will be made with reference to the drawings regarding an arrangement including the IGBTs, as an example.

The source of the upper switching element 4c of the voltage conversion unit 4 is connected to the drain of the lower switching element 4d, and is connected to the positive side of the battery B via the reactor 4a. The drain of the upper switching element 4c is connected to the positive side of the input terminals of the frequency conversion unit 5. The source of the lower switching element 4d is connected to the negative side (ground) of the battery B. The negative side of the input terminals of the frequency conversion unit 5 also matches the ground terminal. Accordingly, the source of the lower switching element 4d is connected to the negative side of the input terminals of the frequency conversion unit 5.

The gates of the upper switching element 4c and the lower switching element 4d are connected to the TCU 10 via a driver circuit 7 (7C). The switching elements 4c and 4d are controlled by the TCU 10, which boosts the voltage from the battery B, and supplies the voltage thus boosted to the frequency conversion unit 5. The TCU 10 controls the switching elements 4c and 4d based upon a boosting instruction value set according to the target torque for the electric rotating machine. Specifically, the TCU 10 boosts the voltage of the battery B and outputs the voltage thus boosted by switching the upper switching element 4c to the OFF state, and by performing an ON/OFF operation of the lower switching element 4d using the PWM control operation, for example. On the other hand, when the electric rotating machine performs a regenerative operation, the voltage conversion unit 4 returns the electric power generated by the electric rotating machine to the battery B as regenerative electric power. For example, the TCU 10 returns the electric power as regenerative electric power via the voltage conversion unit 4 by switching the lower switching element 4d to the OFF state, and by switching the upper switching element 4c to the ON state. It should be noted that, when the voltage of the electric power generated by the electric rotating machine is stepped down, and is returned to the battery B as regenerative electric power, the upper switching element 4c may be operated using the PWM control operation.

The frequency conversion unit 5 is configured using a bridge circuit. Three pairs of switching elements connected in series are connected in parallel between the positive side and the negative side of the input terminals of the frequency conversion unit 5. That is to say, a bridge circuit is formed in which each of the U phase, V phase, and W phase of the stator coils of the electric rotating machines MG1 and MG2 is associated with the corresponding single series-circuit pair. In FIG. 2, reference numeral 8a denotes an upper switching element for the U phase, reference numeral 8b denotes an upper switching element for the V phase, reference numeral 8c denotes an upper switching element for the W phase, reference numeral 8d denotes an lower switching element for the U phase, reference numeral 8e denotes an lower switching element for the V phase, and reference numeral 8f denotes an lower switching element for the W phase.

It should be noted, as the switching elements 8a through 8f in the frequency conversion unit 5, IGBTs or MOSFETs are preferably employed. In the present embodiment, description will be made regarding an arrangement employing IGBTs, as an example.

As shown in FIG. 2, the drains of the upper switching elements 8a, 8b, and 8c, provided by phase, are connected to the positive side of the output terminals of the voltage conversion unit 4 (positive side of the input terminals of the frequency conversion unit 5). The sources of the upper switching elements 8a, 8b, and 8c are connected to the drains of the lower switching elements 8d, 8e, and 8f, provided by phase. Furthermore, the sources of the lower switching elements 8d, 8e, and 8f, provided by phase, are connected to the negative side of the output terminals of the voltage conversion unit 4 (negative side of the input terminals of the frequency conversion unit 5), i.e., the negative side of the battery B (ground). The gates of these switching elements 8a through 8f are connected to the TCU 10 via the driver circuit 7 (7A, 7B), and an individual switching control operation is performed for each of these switching elements 8a through 8f.

The intermediate nodes (connection node that connects the switching elements) 9u, 9v, and 9w of the series circuits formed of the switching element pairs (8a, 8d), (8b, 8e), and (8c, 8f), provided by phase, are connected to stator windings for the U phase, V phase, and W phase of each of the electric rotating machines MG1 and MG2. The driving current supplied to each winding is detected by the current sensor 13. The detection value obtained by the current sensor 13 is received by the TCU 10, and is used to perform the feedback control operation.

Furthermore, the electric rotating machines MG1 and MG2 include rotation detection sensors 11 and 12 such as resolvers or the like, which function as a part of a rotation detection unit. The rotation detection sensors 11 and 12 detect the rotating angles (mechanical angles) of the rotors Ro1 and Ro2. The settings of the rotation detection sensors 11 and 12 are made based upon the numbers of poles (numbers of pole pairs) of the rotors Ro1 and Ro2. An arrangement may be made in which the rotation angles of the rotors Ro1 and Ro2 are converted into the electric angles θ, and signals are output according to the electric angles θ. The TCU 10 computes the revolution (angular speed ω) of each of the electric rotating machines MG1 and MG2, and the control timing of each of the switching elements 8a through 8f of the frequency conversion unit 5 based upon the rotating angles.

The TCU 10 supplies three-phase AC driving current to each of the electric rotating machines MG1 and MG2 by performing the PWM control operation for these switching elements 8a through 8f based upon the target torque and the revolution of each of the electric rotating machines MG1 and MG2. With such an arrangement, each of the electric rotating machines MG1 and MG2 performs a power running operation according to the target revolution and the target torque. Also, when one of or both of the electric rotating machines MG1 and MG2 functions as a generator (in the regenerative operation), the TCU 10 operates in the same way as in the power running operation. That is to say, the TCU 10 performs the PWM control operation based upon the target torque and the target revolution for each of the electric rotating machines MG1 and MG2 so as to convert the electric power generated by each of the electric rotating machines MG1 and MG2 into DC electric power. Thus, each of the electric rotating machines MG1 and MG2 performs the regenerative operation according to the target revolution and the target torque.

As described above, as a preferable embodiment of the contactor 3, in many cases, a relay is employed. In many cases, the relay employed in a high-voltage large-current circuit included in a hybrid vehicle etc., is a relay having a mechanical contact. In a case in which the contactor goes to the opened state during the regenerative operation of the electric rotating machine due to malfunctioning of the mechanical contact, malfunctioning of the electric magnet unit (coil unit), noise contamination in the control signal for the relay, the connection between the electric rotating machine control apparatus 2 and the battery B is unexpectedly released. Furthermore, the connection between the electric rotating machine control apparatus 2 and the battery B can be unexpectedly released due to damage to the power cable that connects the contactor 3 and the battery B, damage to the power cable that connects the contactor 3 and the electric rotating machine control apparatus 2, etc.

In this case, the regenerative electric power, which is to be returned to the battery B via a circuit on the electric rotating machine side, is not returned, and is stored in a smoothing capacitor of the electric rotating machine driving apparatus 2, e.g., the primary smoothing capacitor 4b of the voltage conversion unit 4. This leads to a situation in which the voltage between both terminals of the smoothing capacitor 4b, i.e., the battery voltage (input/output voltage), which is to be returned from the electric rotating machine driving apparatus 2 to the battery B and is to be supplied to the auxiliary apparatus 20, rises. As described above, the battery voltage is measured by the voltage measurement unit 6. The TCU 10 judges based upon the battery voltage thus measured by the voltage measurement unit 6 whether or not the connection between the battery B and the electric rotating machine control apparatus 2 is being maintained. Then, in a case in which the connection is not being maintained, the TCU 10 performs the control operation described below in order to prevent the battery voltage from rising.

Figure 3:
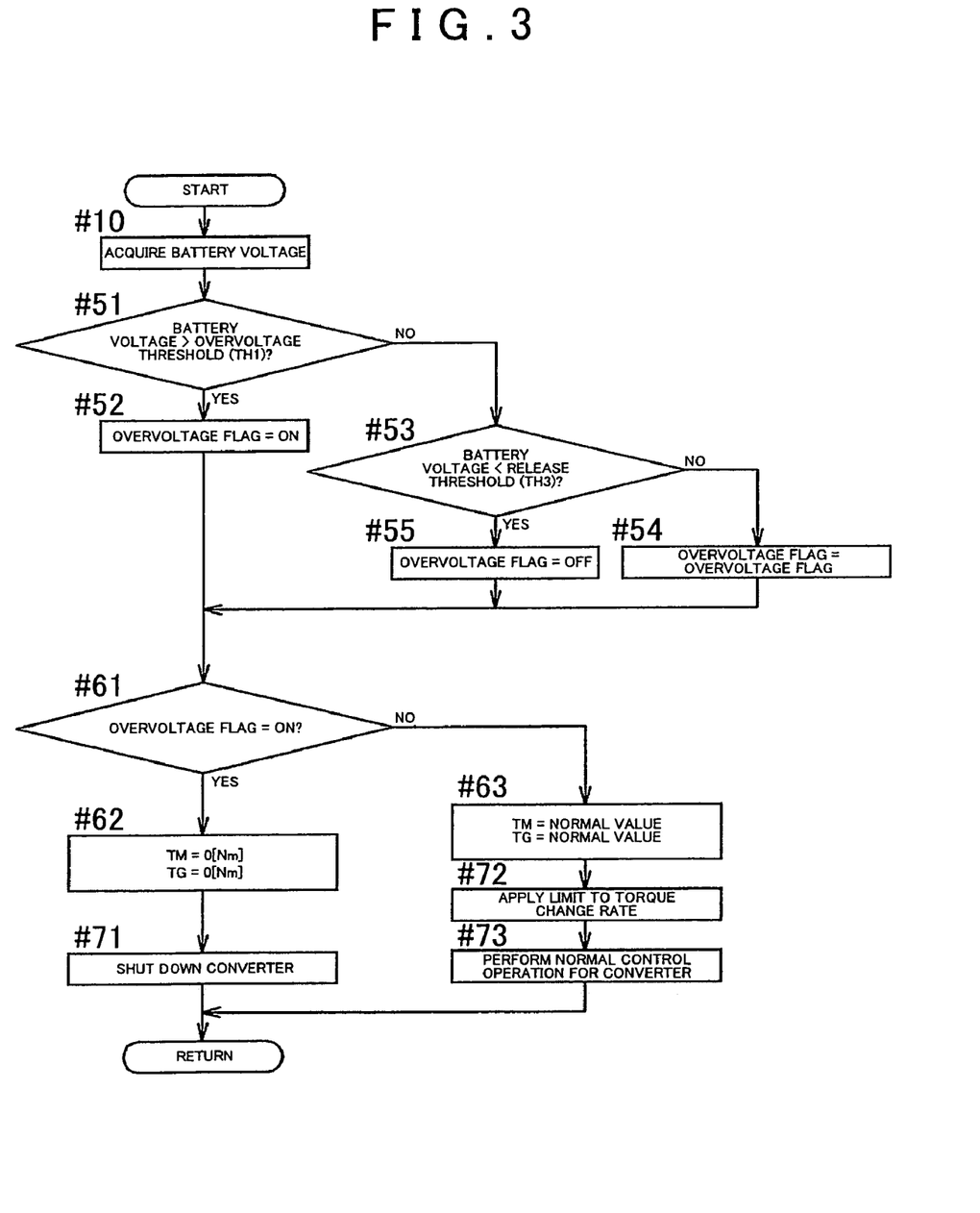
FIG. 3 is a flowchart which shows an example of a control procedure for the electric rotating machine control system according to the present invention.
Figure 4:
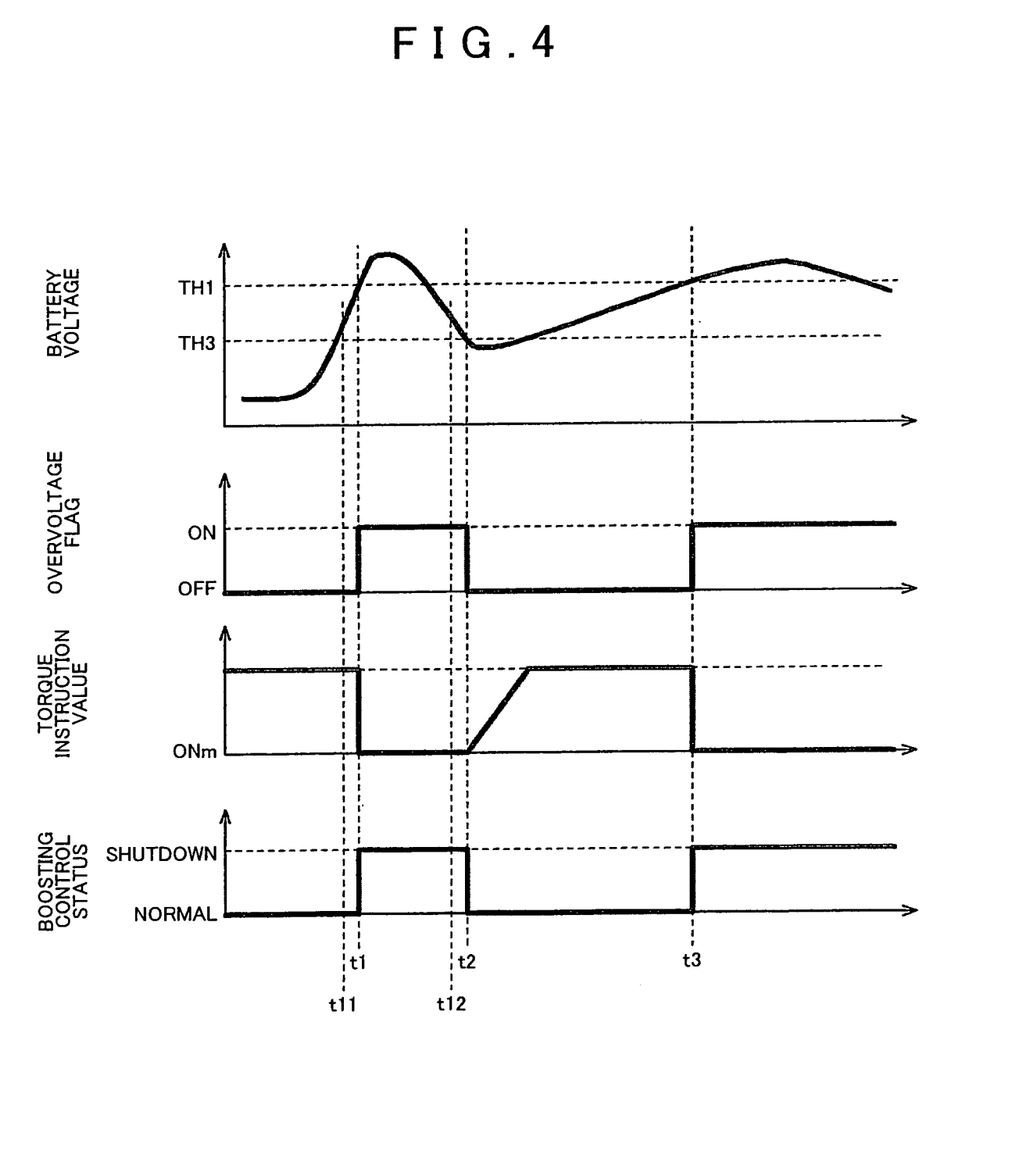
FIG. 4 is a timing chart which shows the relation between the change in battery voltage and the corresponding control operation executed according to the procedure shown in FIG. 3.

FIG. 3 is a flowchart which shows an example of a control procedure for an electric rotating machine control system according to the present invention. FIG. 4 is a timing chart which shows the relation between the change in the battery voltage and the corresponding control operation executed according to the procedure shown in FIG. 3.

The TCU 10 acquires the battery voltage from the voltage measurement unit 6 (#10). Then, the TCU 10 judges whether or not the battery voltage is greater than an overvoltage threshold TH1 (#51). In the example shown in FIG. 4, the rising battery voltage exceeds the overvoltage threshold TH1 at the point in time t1 and the point in time t3. In this case (in a case of "Yes" in #51), the TCU 10 switches an overvoltage flag to the ON state as shown in FIG. 4 (#52). The overvoltage threshold TH1 is preferably set to the sum of the maximum permissible voltage for the battery B and the maximum value of the measurement error of the voltage measurement unit 6 which acquires the battery voltage. As an example, let us consider a case in which the maximum voltage which can be used by the battery B in the normal state is 350 V, and the maximum value of the measurement error of the voltage measurement unit 6 is 20 V. In this case, the overvoltage threshold TH1 is set the sum of these values, i.e., 370 V.

In Step #51, in a case in which determination is made that the battery voltage is not greater than the overvoltage threshold TH1 (in a case of "No" in #51), determination is made whether or not the battery voltage is smaller than the release threshold TH3 (#53). For example, in FIG. 4, at the point in time t11 and the point in time t12, the battery voltage is not greater than the overvoltage threshold TH1, and is not smaller than the release threshold TH3. Accordingly, in this case (in a case of "No" in #53), the state of the overvoltage flag is maintained (#54). That is to say, at the point in time t11, in the time region shown in FIG. 4, the battery voltage has not exceeded the overvoltage threshold TH1 before the point in time t11, and accordingly, the overvoltage flag is in the OFF state. Accordingly, in this case, the OFF state is maintained. On the other hand, the point in time t12 is the point after the point in time t1 at which the battery voltage has exceeded the overvoltage threshold TH1, and accordingly, the overvoltage flag is in the ON state. Accordingly, in this case, the ON state is maintained.

At the point in time t2 shown in FIG. 4, the battery voltage is smaller than the release threshold TH3, and accordingly, determination is made in Step #53 that the battery voltage is smaller than the release threshold TH3 (in a case of "Yes" in #53). In this case, as shown in FIG. 4, the TCU 10 sets the overvoltage flag to the OFF state (#55). As described above, the TCU 10 determines the state of the overvoltage flag by making a judgment with respect to the acquired battery voltage based upon the overvoltage threshold TH1, and by making a judgment with respect to the acquired battery voltage based upon the overvoltage threshold TH1 and the release threshold TH3.

Next, the TCU 10 judges whether or not the overvoltage flag is in the ON state (#61). In a case in which the TCU 10 has judged that the overvoltage flag is in the ON state (in a case of "Yes" in #61), the TCU 10 sets a torque instruction TM for the electric rotating machine functioning as an electric motor to 0 [Nm], and sets a torque instruction TG (regenerative torque) for the electric rotating machine functioning as a generator to 0 [Nm] (#62). In this case, the regenerative electric power obtained from the electric rotating machine is reduced. That is to say, the electric power returned to the battery B via the electric rotating machine driving apparatus 2 as a regenerative electric power is reduced. Accordingly, even in a case in which the connection between the battery B and the electric rotating machine control apparatus 2 has been released, such an arrangement suppresses an increase in the charge stored in the smoothing capacitor of the electric rotating machine driving apparatus 2, e.g., the primary smoothing capacitor 4b of the voltage conversion unit 4. As a result, such an arrangement suppresses rise in the voltage between both terminals of the smoothing capacitor 4b, i.e., the battery voltage (input/output voltage) which is the voltage to be supplied to the auxiliary apparatus 20.

Furthermore, the TCU 10 stops the operation of the voltage conversion unit (converter) 4 in Step #71, in addition to Step #62 in which the torque instruction for the electric rotating machine is set to 0 [Nm]. That is to say, as shown in FIG. 4, the boosting control status is switched from the normal state to the shut-down state. Specifically, the TCU 10 shuts down the converter by switching both the switching elements 4c and 4d to the OFF state. In this case, the connection between the frequency conversion unit 5 and the auxiliary apparatus 20 is released. Accordingly, the regenerative electric power is not supplied to the auxiliary apparatus 20 from the electric rotating machine. As a result, when the connection between the battery B and the electric rotating machine is released, such an arrangement prevents the overvoltage from being applied to the auxiliary apparatus 20 connected to a circuit on the electric rotating machine side.

On the other hand, in a case in which the TCU 10 has judged in Step #61 that the overvoltage flag is in the OFF state as at the point in time t2 shown in FIG. 4 (in a case of "No" in Step #61), the TCU 10 sets the torque instruction TM for the electric rotating machine functioning as an electric motor to a normal value, and sets a torque instruction TG (regenerative torque) for the electric rotating machine functioning as a generator to a normal value (#63). Here, the normal value represents a torque instruction value that corresponds to a target torque determined based upon the requested torque on the vehicle side, the vehicle speed, etc. It should be noted that, during the normal control operation, in order to prevent a rapid change in torque, a limit is applied to the torque change rate which is a rate at which the torque changes per unit of time. Accordingly, after Step #63, the TCU 10 applies the limit to the torque change rate (#72). As shown in FIG. 4, after the point in time t2, the torque instruction value is gradually increased. On the other hand, in a case in which the torque instruction value is to be set to 0 [Nm] as in Step #62, no limit is applied to the torque change rate since this is an urgent operation. Furthermore, the TCU 10 operates the voltage conversion unit (converter) 4 in Step #73. That is to say, the TCU 10 performs a normal control operation for the switching elements 4c and 4d as described above.

Second Embodiment

Description will be made below regarding a second embodiment of the present invention. There is a difference in a part of the procedure of the control operation of the TCU 10 between the first embodiment and the second embodiment. However, the second embodiment has the same system configuration as that of the first embodiment. Accordingly, detailed description of the system configuration and so forth will be omitted.

Figure 5:
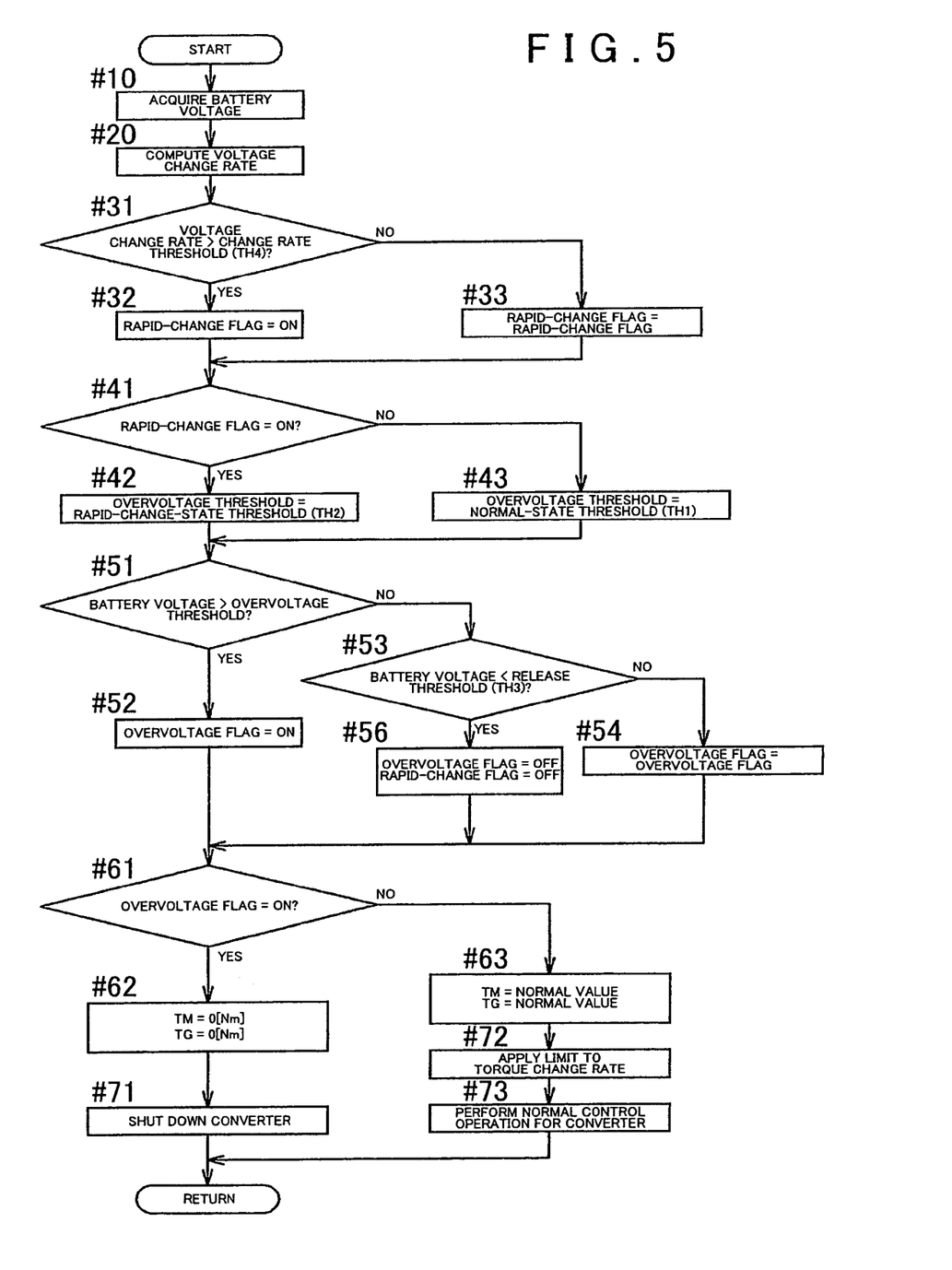
FIG. 5 is a flowchart which shows another example of the control procedure for the electric rotating machine control system according to the present invention.
Figure 6:
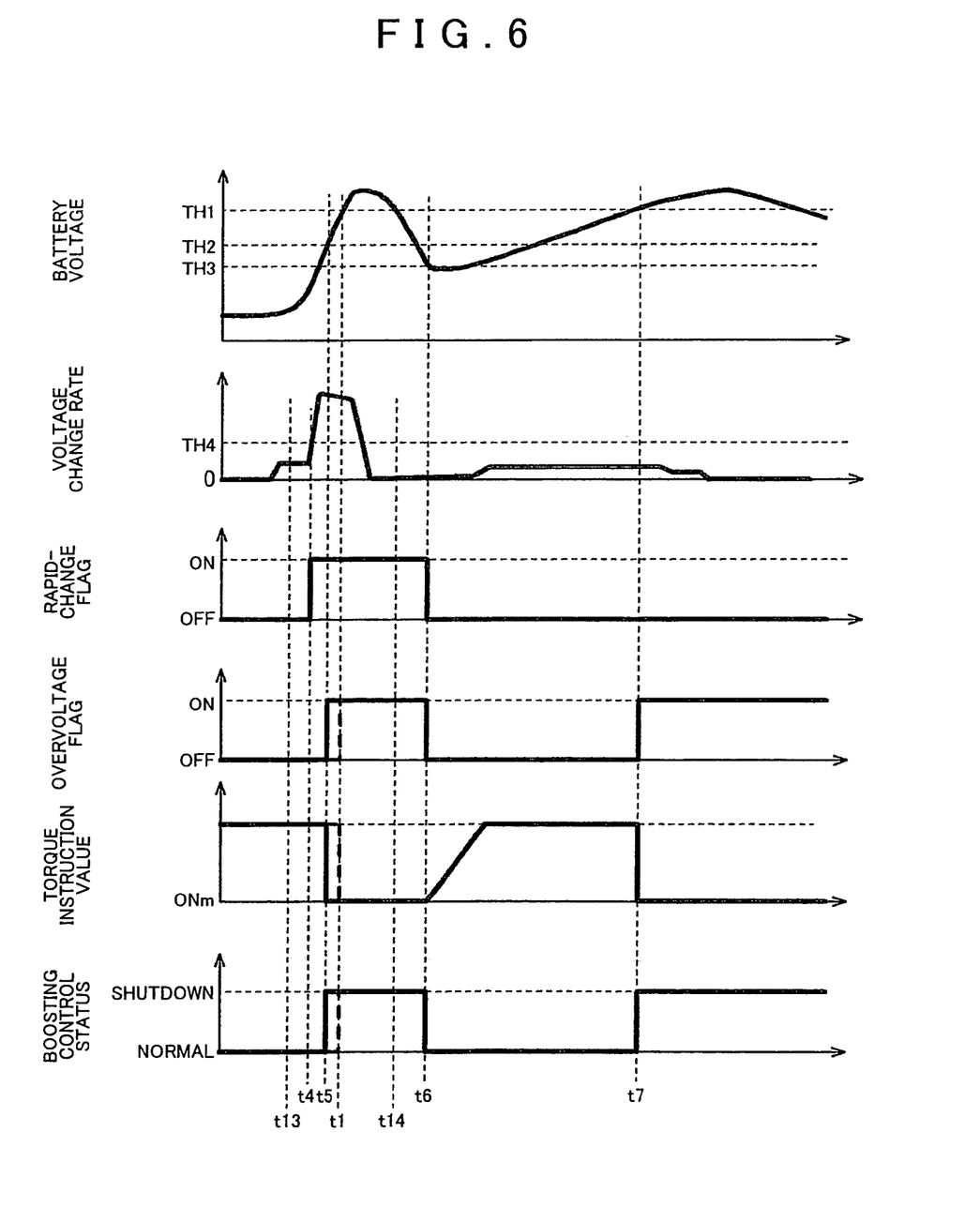
FIG. 6 is a timing chart which shows the relation between the change in the battery voltage and the corresponding control operation executed according to the procedure shown in FIG. 5.

FIG. 5 is a flowchart which shows another example of the control procedure for the electric rotating machine control system according to the present invention. FIG. 6 is a timing chart which shows the relation between the change in the battery voltage and the corresponding control operation executed according to the procedure shown in FIG. 5. It should be noted that, in the flowchart shown in FIG. 5, the steps in which the same processing as that in the flowchart shown in FIG. 3 is executed are denoted by the same reference numerals.

The TCU 10 acquires the battery voltage from the voltage measurement unit 6 (#10). Then, the TCU 10 computes the voltage change rate by calculating the differentiation of the battery voltage, for example (#20). It should be noted that the voltage measurement unit 6 may perform this computation, and may output the computation result to the TCU 10. Next, the TCU 10 judges whether or not the voltage change rate is greater than a predetermined change rate threshold TH4 (#31). In the example shown in FIG. 6, the voltage change rate of the battery voltage which exhibits a rapid rise exceeds the change rate threshold TH4 at the point in time t4. In this case (in a case of "Yes" in #31), the TCU 10 switches the rapid-change flag to the ON state as shown in FIG. 6 (#32).

In Step #31, in a case in which determination has been made that the battery voltage has not exhibited a change greater than the change rate threshold TH4 (in a case of "No" in #31), the state of the rapid-change flag is maintained (#33). For example, as shown in FIG. 6, the voltage change rate has not exceeded the change rate threshold TH4 before the point in time t13, and accordingly, the rapid-change flag is in the OFF state. Accordingly, in this case, the rapid-change flag is maintained in the OFF state. On the other hand, the point in time t14 is the point after the point in time t4 at which the voltage change rate has exceeded the change rate threshold TH4. Accordingly, the change rate flag is maintained in the ON state although the change rate at the point in time t14 is smaller than that at the point in time t13. As described above, the TCU 10 determines the state of the rapid-change flag based upon the voltage change rate.

Next, the TCU 10 judges whether or not the rapid-change flag is in the ON state (#41). In a case in which the TCU 10 has judged that the rapid-change flag is in the OFF state (in a case of "No" in #41), the TCU 10 sets the overvoltage threshold to the normal-state threshold (normal-state overvoltage threshold) TH1 which is the same value as that in the first embodiment (#43). On the other hand, in a case in which the TCU 10 has judged that the rapid-change flag is in the ON state (in a case of "Yes" in #41), the TCU 10 sets the overvoltage threshold to a rapid-change-state threshold (overvoltage threshold in the rapid change state) TH2 which is smaller than the normal-state threshold TH1 (#42).

The following steps are approximately the same as those in the first embodiment. Accordingly, description thereof will be made later, and partial description thereof will be omitted as appropriate. By performing Steps #41 and #42, such an arrangement is capable of switching the overvoltage flag to the ON state quickly. That is to say, as indicated by the dotted line shown in FIG. 6, in the judgment based upon the normal-state threshold TH1, at the point in time t1, the overvoltage flag goes to the ON state, and the torque instruction value and the boosting control status are changed. However, in the present embodiment, the overvoltage flag goes to the ON state at the point in time t5 which is earlier than the point in time t1. Thus, the TCU 10 is capable of switching the torque instruction value and the boosting control status at an earlier timing.

After the overvoltage threshold has been set in Step #42 or Step #43, the TCU 10 judges whether or not the battery voltage is greater than the overvoltage threshold (TH1 or TH2) (#51). In the example shown in FIG. 6, at the point in time t5 at which the rapid-change flag is in the ON state, the rising battery voltage exceeds the overvoltage threshold (rapid-change-state threshold) TH2 (in a case of "Yes" in #51), and accordingly, the overvoltage flag goes to the ON state (#52). Furthermore, at the point in time t7 at which the rapid-change flag is in the OFF state, the rising battery voltage exceeds the overvoltage threshold (normal-state threshold) TH1, and accordingly, the overvoltage flag goes to the ON state.

In the same way as in the first embodiment, in a case in which judgment has been made in Step #51 that the battery voltage is not greater than the overvoltage threshold (in a case of "No" in #51), in the next step, judgment is made whether or not the battery voltage is smaller than the release threshold TH3 (#53). In a case in which the battery voltage is not smaller than the release threshold TH3 (in a case of "No" in #53), the state of the overvoltage flag is maintained (#54). On the other hand, in a case in which the battery voltage is smaller than the release threshold TH3 (in a case of "Yes" in #53), the TCU 10 sets the overvoltage flag and the rapid-change flag to the OFF state (#56). As described above, the TCU 10 determines the overvoltage flag by executing the processing in Steps #10 through #56 based upon the battery voltage and the voltage change rate.

Subsequent steps are the same as those in the first embodiment. After the TCU 10 has determined the state of the overvoltage flag, the TCU 10 judges whether or not the overvoltage flag is in the ON state (#61). In a case in which the TCU 10 has judged that the overvoltage flag is in the ON state (in a case of "Yes" in #61), the TCU 10 sets the torque instruction TM for the electric rotating machine functioning as an electric motor to 0 [Nm], and sets the torque instruction TG (regenerative torque) for the electric rotating machine functioning as a generator to 0 [Nm] (#62). Furthermore, in Step #62, the TCU 10 stops the operation of the voltage conversion unit (converter) 4 in Step #71, in addition to Step #62 in which the torque instruction for the electric rotating machine is set to 0 [Nm]. That is to say, the boosting control status is switched from the normal state to the shutdown state (see FIG. 6).

On the other hand, in a case in which the TCU 10 has judged in Step #61 that the overvoltage flag is in the OFF state (in a case of "No" in #61), the TCU 10 sets the torque instruction TM for the electric rotating machine functioning as an electric motor to a normal value, and sets the torque instruction TG (regenerative torque) for the electric rotating machine functioning as a generator to a normal value (#63). Furthermore, after Step #63, the TCU 10 applies a limit to the torque change rate (#72). As described above, in a case in which the torque instruction value is to be set to 0 [Nm] as in Step #62, no limit is applied to the torque change rate since this is an urgent operation. Furthermore, the TCU 10 operates the voltage conversion unit (converter) 4 in Step #73.

As described above, according to the present invention, in a case in which the connection between the DC power supply which supplies electric power to the electric rotating machine and the electric rotating machine is disconnected, the overvoltage is prevented from being applied to a circuit on the electric rotating machine side and an auxiliary apparatus connected to the circuit.

Other Embodiments

[1] Description has been made in the aforementioned embodiment regarding an arrangement in which, in Step #62 shown in FIG. 3 and FIG. 5, both the torque instruction TM for the electric rotating machine functioning as an electric motor and the torque instruction TG (regenerative torque) for the electric rotating machine functioning as a generator are set to 0 [Nm]. Also, an arrangement may be made in which the torque instruction TG (regenerative torque) for the electric rotating machine functioning as a generator is set to 0 [Nm], and a normal torque instruction TM is set for the electric rotating machine functioning as an electric motor.

In the state in which the connection between the battery B and the electric rotating machine driving apparatus 2 is not maintained, the electric power which drives the electric rotating machine functioning as an electric motor is supplied from a capacitive circuit principally including the smoothing capacitors 4b and 4b included in the electric rotating machine driving apparatus 2. The purpose of the present invention is to prevent the overvoltage occurring at the connection between the battery B and the electric rotating machine driving apparatus 2. Accordingly, it is preferable that the electric power stored in the electric rotating machine driving apparatus 2 is consumed in an early stage. By setting the torque instruction TG (regenerative torque) for the electric rotating machine functioning as a generator is set to 0 [Nm], such an arrangement prevents electric power from being generated anew. Furthermore, by setting the normal torque instruction TM for the electric rotating machine functioning as an electric motor, the electric power stored in the electric rotating machine driving apparatus 2, including generated electric power, is consumed. Thus, such an arrangement suitably prevents the overvoltage from occurring at the connection that connects the battery B and the electric rotating machine driving apparatus 2.

[2] Description has been made in the aforementioned second embodiment regarding an arrangement in which the setting of the rapid-change flag is determined based upon the voltage change rate at which the battery voltage rises. However, in a case in which the driving circuit includes a booster circuit such as the voltage conversion unit 4, the voltage fluctuates due to the effect of an LC circuit formed of the reactor and the capacitor included in the booster circuit. Accordingly, the rapid-change flag is preferably determined based upon the absolute value of the voltage change rate of the battery voltage, giving consideration to the fluctuation of the battery voltage. In this case, the rapid-change flag readily goes to the ON state. However, the settings of the torque instruction and so forth are made based upon the determination results made based upon the overvoltage threshold. Thus, such an arrangement has no problem.

[3] Description has been made in the aforementioned embodiment regarding an arrangement in which a hybrid vehicle is provided with a pair of electric rotating machines, one of the electric rotating machines functions as an electric motor, and the other electric rotating machine functions as a generator. Also, the present invention can be applied to a desired hybrid vehicle which includes a single electric rotating machine, and in which the electric rotating machine has a mode in which the electric rotating machine functions as an electric motor and a mode in which the electric rotating machine functions as a generator.

[4] Description has been made in the aforementioned embodiment regarding an arrangement in which the vehicle is a hybrid vehicle which includes an electric rotating machine functioning as a driving source and another driving source (engine) which differs from the electric rotating machine. However, the target of the present invention is a system including an electric rotating machine subjected to a driving control operation by an electric rotating machine driving apparatus including a voltage conversion unit. Accordingly, the present invention can be applied to an arrangement including only an electric rotating machine as a driving source. Thus, the present invention can be applied to an electric vehicle employing an electric rotating machine as a driving source.

Figure 7:
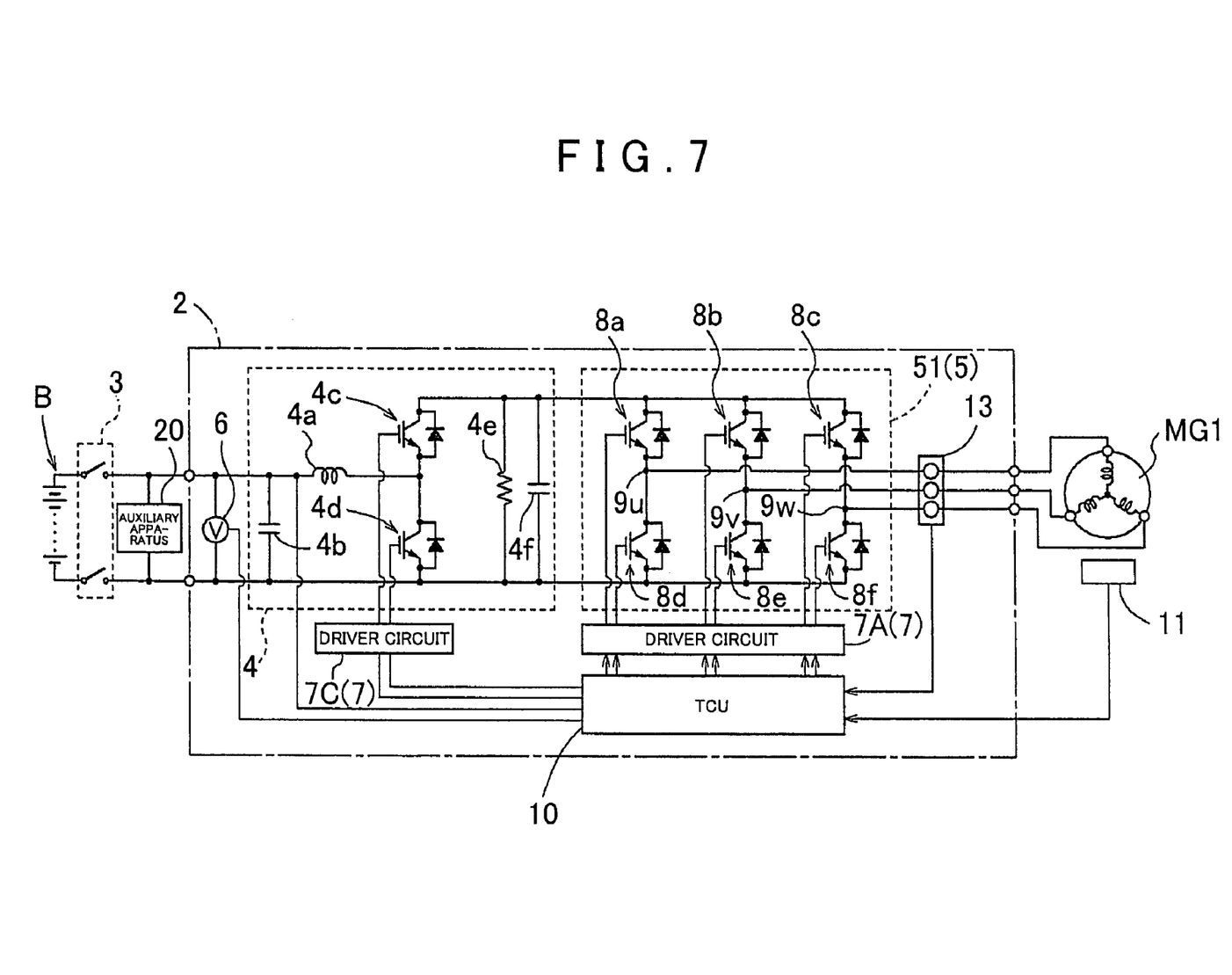
FIG. 7 is a schematic block diagram which shows another example of the configuration of the electric rotating machine control system.

[5] Description has been made in the aforementioned embodiment regarding an arrangement in which the electric rotating machine driving apparatus 2 (driving circuit) includes the voltage conversion unit 4. However, the present invention is not restricted to such an arrangement. Also, the present invention can be applied to an electric rotating machine control system including a driving circuit having no converter such as the voltage conversion unit 4. Even in such a system, the connection between the driving circuit and the DC power supply includes a capacitor that corresponds to the smoothing capacitor 4f shown in FIG. 2 or FIG. 7. Accordingly, such a system has the same problem as that of the driving circuit according to the present embodiment. Thus, the problem can be solved using the same solving means.

The present invention can be applied to at least an electric rotating machine control system which controls an electric rotating machine which performs a regenerative operation. Furthermore, the present invention can be applied to a vehicle driving system including the aforementioned electric rotating machine control system.

According to an exemplary aspect of the invention, in a case in which the connection between the DC power supply and the driving circuit is not being maintained, the regenerative electric power to be returned to the DC power supply is not returned, leading to an extreme rise in the voltage on the driving circuit side. On the other hand, with the present characteristic structure, in a case in which the connection between the DC power supply and the driving circuit is not being maintained, the control unit controls the driving circuit such that the regenerative electric power obtained by the electric rotating machine is reduced. Thus, it is possible to suppress a rise in the voltage on the driving circuit side. As a result, in a case in which the connection between the DC power supply which supplies electric power to the electric rotating machine and the electric rotating machine is released, overvoltage is prevented from being applied to a circuit on the electric rotating machine side such as the driving circuit. Furthermore, it is possible to prevent overvoltage from being applied to an auxiliary apparatus connected to a circuit on the electric rotating machine side.

According to an exemplary aspect of the invention, when the electric rotating machine is controlled such that the regenerative torque becomes zero, the regenerative electric power obtained by the electric rotating machine is properly reduced. Thus, such an arrangement suppresses a rise in the voltage on the driving circuit side. As a result, in a case in which the connection between the DC power supply which supplies electric power to the electric rotating machine and the electric rotating machine is released, overvoltage is prevented from being applied to a circuit on the electric rotating apparatus side such as the driving circuit and so forth and an auxiliary apparatus connected to this circuit.

According to an exemplary aspect of the invention, in order to allow the electric rotating machine to exhibit the maximum torque even in a higher revolution region, in some cases, a voltage conversion unit is provided so as to boost the voltage which is used to drive the electric rotating machine. Such a voltage conversion unit is provided between the DC power supply and the frequency conversion unit. On the other hand, in some cases, an auxiliary apparatus such as an air conditioner or the like is further connected to the connection between the driving circuit and the DC power supply. There is no need to boost the voltage to be applied to the auxiliary apparatus. Accordingly, in general, the connection to the auxiliary apparatus is branched from a node between the voltage conversion unit and the DC power supply. Here, as in the configuration described above, in a case in which the connection between the DC power supply and the driving circuit is not being maintained, and the operation of the voltage conversion unit has been stopped, the connection between the frequency conversion unit and the auxiliary apparatus is released. Accordingly, in this case, the regenerative electric power is not supplied from the electric rotating machine to the auxiliary apparatus. As a result, in a case in which the connection between the DC power supply and the electric rotating apparatus has been released, such an arrangement prevents overvoltage from being applied to the auxiliary apparatus connected to a circuit on the electric rotating machine side.

According to an exemplary aspect of the invention, in order to stabilize the power supply, the electric circuit, in particular, a power supply line (transmission line) includes a smoothing capacitor between the positive terminal and the negative terminal at the connection with the apparatus or circuit. Also, the connection between the DC power supply and the driving circuit includes such a smoothing capacitor. With such an arrangement, in a case in which the connection between the DC power supply and the driving circuit has been released during the regenerative operation of the electric rotating machine, the charge left behind is stored in the smoothing capacitor, leading to a rise in the voltage difference between both terminals thereof. Accordingly, by monitoring the input/output voltage at the connection that connects the driving circuit and the DC power supply during the regenerative operation of the electric rotating machine, such an arrangement judges the connection state between the DC power supply and the driving circuit in a simple and secure manner.

According to an exemplary aspect of the invention, in a case in which the connection between the DC power supply and the driving circuit has been released during the regenerative operation of the electric rotating machine, the charge left behind is stored in the smoothing capacitor, leading to a rise in the voltage difference between both terminals thereof. Accordingly, in a case in which the input/output voltage has exceeded a predetermined overvoltage threshold, the control unit judges that the connection between the DC power supply and the driving circuit is not being maintained. This allows the connection state between the DC power supply and the driving circuit to be judged in a simple and secure manner.

According to an exemplary aspect of the invention, in a case in which the connection between the DC power supply and the driving circuit has been released due to an unexpected situation, it is needless to say that the electric conditions suitable for the releasing operation are not necessarily satisfied. In a case in which the electric conditions suitable for the releasing operation have not been satisfied, in many cases, the input/output voltage at the connection greatly fluctuates. In other words, in a case in which there is great fluctuation in the input/output voltage at the connection, it is highly possible that there will be an unexpected situation such as a situation in which the connection between the DC power supply and the driving circuit has been released. Accordingly, it is preferable that, in a case in which the voltage change rate, at which the input/output voltage rises per unit of time, has exceeded a predetermined change-rate threshold, the control unit makes judgment based upon a higher sensitive judgment condition (judgment condition having higher sensitivity). That is to say, by judging whether or not the connection between the DC power supply and the driving circuit is being maintained based upon a rapid-change-state overvoltage threshold set to a smaller value than the overvoltage threshold, the control unit is capable of judging the connection state between the DC power supply and the driving circuit quickly. In particular, in a case in which the driving circuit includes a voltage booster circuit, in many cases, the voltage fluctuates due to the effect of an LC circuit formed of a reactor and a capacitor included in the voltage booster circuit, leading to a difficulty in detecting the overvoltage. However, the control unit makes a judgment giving consideration to the voltage change rate, thereby alleviating the problem.

According to an exemplary aspect of the invention, the overvoltage threshold is set to the sum of the maximum voltage of the DC power supply such as a battery or the like, which can be used in the normal state, and the maximum value of the measurement error of the voltage measurement unit which detects the input/output voltage of a voltage sensor and the like. Such an arrangement prevents the regenerative operation from being limited due to the detection error of the sensor in a secure manner when the voltage of the DC power supply is within a range which can be used in the normal state. Furthermore, judgment is made whether or not overvoltage has occurred, based upon the smallest voltage for limiting the regenerative operation. Thus, the overvoltage can be detected at an earlier stage. Thus, such an arrangement prevents the overvoltage from being applied to the circuit on the electric rotating machine side and the auxiliary apparatus connected to the circuit in a secure manner.

According to an exemplary aspect of the invention, a hybrid vehicle is provided which includes a pair of electric rotating machines, and another driving source (e.g., engine) that differs from the pair of electric rotating machines, and which performs so-called split-type power distribution. In addition, the hybrid vehicle provides the operation of the pair of electric rotating machines with a requested revolution and a requested torque. Furthermore, it is possible to easily realize a system which provides a necessary voltage to each of the electric rotating machines forming the pair using a single voltage conversion unit in a simple manner.

According to an exemplary aspect of the invention, a hybrid vehicle is provided in a simple manner, which performs split-type power distribution using a single planetary gear mechanism.

What is claimed is:

1. An electric rotating machine control system comprising:
an electric rotating machine;
a driving circuit that is connected to a DC power supply, the driving circuit includes a frequency conversion unit configured such that:
  when the electric rotating machine is to be driven in a power running mode, the frequency conversion unit converts an output of the DC power supply into AC electric power, and
  when the electric rotating machine is to be driven in a regenerative operation mode, the frequency conversion unit converts an output of the electric rotating machine into DC electric power; and
a control unit that controls the driving circuit,
wherein the control unit judges whether a connection between the DC power supply and the driving circuit is being maintained, and is configured such that, when the connection is not being maintained, regenerative electric power generated by the electric rotating machine is reduced by controlling the driving circuit,
wherein, when the connection between the DC Dower supply and the driving circuit is not being maintained, the control unit controls the driving circuit such that regenerative torque obtained by the electric rotating machine immediately becomes zero,
wherein the control unit judges, based upon an input/output voltage at the connection that connects the driving circuit and the DC power supply, whether the connection between the DC power supply and the driving circuit is being maintained, wherein, when the input/output voltage is grater than a predetermined overvoltage threshold, the control unit judges that the connection between the DC power supply and the driving circuit is nor being maintained, and wherein, when a voltage change rate, at which the input/output voltage rises per unit of time, is greater than a predetermined change rate threshold, the control unit judges, based upon a rapid-change-state overvoltage threshold set to a smaller value than the predetermined overvoltage threshold, whether the connection between the DC power supply and the driving circuit is being maintained.

2. The electric rotating machine control system according to claim 1, wherein:
the driving circuit includes a voltage conversion unit between the DC power supply and the frequency conversion unit, the voltage conversion unit boosts the output of the DC power supply, and
when the connection between the DC power supply and the driving circuit is not being maintained, the control unit stops an operation of the voltage conversion unit.

3. The electric rotating machine control system according to claim 1, wherein the predetermined overvoltage threshold is set to a sum of a maximum voltage of the DC power supply and a maximum value of an error of a voltage measurement unit that detects the input/output voltage.

4. The electric rotating machine control system according to claim 1, wherein when the connection between the DC power supply and the driving circuit is not being maintained, the control unit controls the driving circuit such that no limit is applied to a torque change rate.

5. A vehicle driving system comprising:
the electric rotating machine control system according to claim 1;
a first electric rotating machine and a second electric rotating machine as the electric rotating machine; and
a power distribution mechanism that distributes a driving force generated by another driving source that differs from the first electric rotating machine and the second electric rotating machine, wherein:
a part of the driving force thus distributed by the power distribution mechanism is transmitted to a wheel, and
a remaining part of the driving force is transmitted to the first electric rotating machine, and
the driving force generated by the second electric rotating machine is transmitted to the wheel.

6. The vehicle driving system according to claim 5, wherein:
the power distribution mechanism has a configuration including a planetary gear mechanism having a first rotating element, a second rotating element, and a third rotating element, and
the first electric rotating machine is connected to the first rotating element, the driving source that differs from the first electric rotating machine and the second electric rotating machine is connected to the second rotating element, and the second electric rotating machine and the third rotating element are connected to the wheel.

* * * * *